United States Patent
Cheng et al.

(10) Patent No.: US 6,663,745 B1
(45) Date of Patent: Dec. 16, 2003

(54) METHOD FOR MANUFACTURING HOLLOW FIBER MEMBRANES

(75) Inventors: Kwok-Shun Cheng, Nashua, NH (US); Cha P. Doh, Sudbury, MA (US)

(73) Assignee: Mykrolis Corporation, Billerica, MA (US)

(*) Notice: Subject to any disclaimer, the term of this patent is extended or adjusted under 35 U.S.C. 154(b) by 0 days.

(21) Appl. No.: 09/890,111

(22) PCT Filed: Jan. 28, 2000

(86) PCT No.: PCT/US00/02382

§ 371 (c)(1),
(2), (4) Date: Jul. 26, 2001

(87) PCT Pub. No.: WO00/44480

PCT Pub. Date: Aug. 3, 2000

Related U.S. Application Data
(60) Provisional application No. 60/117,853, filed on Jan. 29, 1999.

(51) Int. Cl.[7] .................. B32B 31/00; B01D 63/02
(52) U.S. Cl. .................. 156/293; 156/294; 156/296; 210/321.8
(58) Field of Search .................. 156/293, 294, 156/166, 296; 210/321.8

(56) References Cited

U.S. PATENT DOCUMENTS

| | | | |
|---|---|---|---|
| 3,760,949 A | * | 9/1973 | Carey et al. ............ 210/321.8 |
| 4,049,765 A | * | 9/1977 | Yamazaki ............... 264/261 |
| 4,902,456 A | | 2/1990 | Yen et al. |
| 4,906,377 A | | 3/1990 | Yen et al. |
| 4,980,060 A | * | 12/1990 | Muto et al. ............ 210/321.8 |
| 4,990,294 A | | 2/1991 | Yen et al. |
| 5,032,274 A | | 7/1991 | Yen et al. |
| 5,154,827 A | | 10/1992 | Ashelin et al. |
| 5,158,680 A | | 10/1992 | Kawai et al. |
| 5,228,992 A | * | 7/1993 | Degen ................... 210/321.8 |
| 5,490,931 A | | 2/1996 | Chung et al. |
| 5,695,702 A | | 12/1997 | Niermeyer et al. |
| 5,762,789 A | | 6/1998 | de los Reyes et al. |
| 5,855,783 A | | 1/1999 | Shucosky et al. |

FOREIGN PATENT DOCUMENTS

| | | | |
|---|---|---|---|
| DE | 3444387 | | 7/1985 |
| EP | 0 175 432 | | 3/1986 |
| EP | 0 217 482 | | 4/1987 |
| EP | 0 299 459 | | 1/1989 |
| EP | 0 340 732 | | 11/1989 |
| EP | 0 343 247 | | 11/1989 |
| EP | 0343247 B1 | * | 3/1993 |
| EP | 0 559 149 | | 9/1993 |
| EP | 0 803 281 | | 10/1997 |
| EP | 0 855 212 | | 7/1998 |
| FR | 2 566 003 | | 12/1985 |
| JP | 64-20314 A | * | 1/1989 |
| WO | WO 00/44479 | | 8/2000 |
| WO | WO 00/44482 | | 8/2000 |
| WO | WO 00/44483 | | 8/2000 |
| WO | WO 00/44484 | | 8/2000 |
| WO | WO 00/44485 | | 8/2000 |
| WO | WO 00/444870 | | 8/2000 |

OTHER PUBLICATIONS

Derwent Publication XP–002142276 Abstract of JP 04 354521.

* cited by examiner

Primary Examiner—Jeff H. Aftergut
(74) Attorney, Agent, or Firm—Timothy J. King; Paul J. Cook; Mykrolis Corporation

(57) ABSTRACT

A method for producing a filter element of a plurality of hollow fiber membranes made of perfluorinated thermoplastic polymer with a pot or seal made of perfluorinated thermoplastic polymer. A bundle of hollow fiber membranes is prepared with the fibers substantially aligned, with at least one end sealed. The sealed end is placed in a temporary recess made in a molten pool of perfluorinated thermoplastic potting material and held in the molten pool while potting material flows around and up the fibers to form a unified pot after cooling and solidification of the potting material.

11 Claims, 7 Drawing Sheets

METHOD FOR MANUFACTURING HOLLOW FIBER MEMBRANES

This application claims the benefit of provisional application No. 60/117,853 filed Jan. 29, 1999. This application is a 37 CFR 371 national stage application of PCT/US00/02382 filed Jan. 28, 2000.

This invention provides for a simplified method to produce a filter element comprising a plurality of perfluorinated thermoplastic hollow fiber membranes, of substantially equal length, arranged lengthwise, and perfluorinated thermoplastic end seals, or pots. The invention further provides for the filter element made by the inventive method.

BACKGROUND OF THE INVENTION

A hollow fiber membrane is a tubular filament comprising an inner diameter, an outer diameter, with a wall thickness, usually porous, between them. The inner diameter defines the hollow portion of the fiber and is used to carry fluid, either the feed fluid to be filtered, or the permeating fluid, if the fluid being filtered contacts the outer surface. The inner hollow portion is sometimes called the lumen.

Hollow fiber membranes are used for diverse applications, including gas separation, reverse osmosis, ultrafiltration and particle and bacteria removal with microporous membranes. In these applications, the membrane acts as a permeable barrier, allowing the passage of the carrier fluid and some dissolved or dispersed species, and retaining other selected species due to differences in specie size, permeation rates, or other physical or chemical attributes.

In practical applications, fiber is cut or otherwise made to a specific length and a number of fibers gathered into a bundle. A portion of one or both ends of the fiber bundle are encapsulated in a material which fills the interstitial volume between fibers and forms a tube sheet. This process is sometimes called potting the fibers and the material used to pot the fibers is called the potting material. The tube sheet acts as a seal in conjunction with a filtration device. If the encapsulation process closes and seals the fiber ends, one or both ends of the potted fiber bundle are cut across the diameter or otherwise opened. In some cases, the open fiber ends are closed and sealed before encapsulation to prevent the encapsulation material from entering the open ends. If only one end is to be opened to permit fluid flow, the other end is left closed or is sealed. The filtration device supports the potted fiber bundle and provides a volume for the fluid to be filtered and its concentrate, separate from the permeating fluid. In use, a fluid stream contacts one surface and separation occurs at the surface or in the depth of the fiber wall. If the fiber outer surface is contacted, the permeating fluid and species pass through the fiber wall and are collected in the lumen and directed to the opened end or ends of the fiber. If the fiber inner surface is contacted, the fluid stream to be filtered is fed into the open end or ends and the permeating fluid and species pass through the fiber wall and are collected from the outer surface.

A variety of materials are used to form the seal. Epoxy resins and urethanes are commonly used as components for the seal. Thermoplastic polymers are another important class. These are polymers that can be flowed and molded when heated and recover their original solid properties when cooled. As the conditions of the application for which the filtration device is being used become more severe, the materials that can be used to form the seal becomes limited. For example, the organic solvent-based solutions used for wafer coating in the microelectronics industry will dissolve or swell and weaken urethane or epoxy based seals. The high temperature stripping baths in the same industry consist of highly acidic and oxidative compounds, which will destroy seals made of common polymers. Seals made from perfluorinated thermoplastics have exceptional resistance to chemical and thermal degradation and would provide excellent sealing material.

Membranes made of perfluorinated thermoplastic polymers are very useful in filtration applications requiring high degree of chemical and thermal resistance. To fully benefit from the properties of the perfluorinated thermoplastic membranes, a filter element using such membranes must be made of materials having similarly resistant properties. For high temperature operation it is preferrable that the melting temperature of the potting material be as close as possible to the melting temperature of the hollow fiber membranes. This will maximize the operational temperature because the operational temperature will be limited to approximately the lower melting temperature of the filter components. Also, it is difficult to pot perfluorinated thermoplastic membranes with dissimilar potting materials and obtain good bonding between the potting material and the perfluorinated thermoplastic membranes. For filtration of ultrapure solutions, exceedingly low levels of extractable residual matter is required of the filtration device. Perfluorinated thermoplastics are commonly used in applications which require very low extractable matter and a filter made entirely of perfluorinated thermoplastic materials would have an advantage in such applications. For these reasons, it is desirable to have a method of potting perfluorinated thermoplastic membranes in a perfluorinated thermoplastic potting material.

Manufacturing a filter element from thermoplastic hollow fiber membranes using thermoplastic polymers as a sealing material is more difficult than with typical resinous materials such as reactive epoxies and urethanes. Epoxies and urethanes used for this application as chosen to have good flow properties so that they can easily flow around the fibers to be sealed. These materials comprise low molecular weight reactive components, having low viscosities, which react to form the final pot after being flowed or otherwise loaded into a portion of a vessel containing a fiber bundle. Thermoplastic polymers are polymers which can be flowed and molded when heated and recover their original solid properties when cooled. Thermoplastic polymers are high molecular weight materials and have high viscosity. They do not easily flow around the fibers of a fiber bundle, and are not prone to flow uniformly around or through a mass of fibers. Thermoplastic materials have to be heated to melt or soften them in order to flow. The hot thermoplastic material can have detrimental effects on the fibers being sealed. Perfluorinated thermoplastics are particularly difficult to use as potting materials because of their high melting temperature and high viscosity. Perfluorinated thermoplastic polymers have to be heated to above their melting point to be extruded or injected. Too long a contact of the perfluorinated thermoplastic potting material heated above its melting point with porous hollow fiber membranes of similar melting points will cause melting and collapse of the hollow fibers. If the perfluorinated thermoplastic potting material cools too quickly as it is being flowed into the fiber bundle, it will not completely fill the interstitial spaces between the fibers. It will instead tend to form occluded volumes from the cooled potting material not being able to easily flow. These will result in weaknesses and possible leaks. Practitioners have attempted to overcome these difficulties in a variety of complicated schemes.

U.S. Pat. Nos. 4,980,060 and 5,066,397 discloses methods of making a filter element comprising a plurality of porous hollow fiber membranes of a thermoplastic resin, fusion bonded at the periphery of the end portions to form a terminal block. In one embodiment, thermoplastic hollow fiber membranes containing fine particle inorganic filler are dipped in a mixture of gypsum and water to seal the end openings. The end portions are dipped in a solvent for the inorganic filler to wash away the filler only from the surface of the end portions. The extraction operation may be effected efficiently by carrying by dipping the end portions of the membranes in the solvent while subjecting the solvent to ultrasonic treatment. The sealed end portions are arranged in a bundle in a lengthwise direction and the end portions are heated to at least the softening temperature of the resin used to make the membranes. The peripheries of the end portions of mutually adjacent membranes should be kept in contact during the heating step, as by winding a non-adhesive tape around the end portions prior to the heat treatment. The tape is removed after the heat treatment. In another embodiment, a powdery thermoplastic resin is applied to the peripheries of the end portions of the membranes. The resin is applied by dipping the end portions into a liquid, and then either putting the end portions wetted with the liquid in the powdery resin or spraying or spreading the powdery resin to the wetted end portions. When a plurality of membranes is dipped into the liquid, the inner membranes are not often not readily wetted. In such a case, the liquid may be subjected to an ultrasonic treatment. The powdery resin can also be applied by first preparing a mixture of the same liquid and the powdery resin and then dipping the end portions in the mixture or spraying or spreading the mixture onto the peripheries of the end portions. The membranes are then arranged in a lengthwise direction to form a bundle and the sealed end portions are heated to a temperature at least as high as the softening point of the resin used to make the membranes as described in the previous embodiment so that the end portions are fusion-bonded through the thermoplastic resin medium resulting from the powdery thermoplastic resin. In both these embodiments, the fiber bundle is subjected to complete extraction of the filler after the heat treatment. In another embodiment, unfilled membranes are heated without powdery resin material adhered to the peripheries while feeding an inert gas from openings at the opposite end of the fibers. There are several difficulties inherent in these complex operations. It would require exhaustive extraction to reduce the inorganic filler content to a sufficiently low level to be suitable for use in ultrapure fluid filtration, as is required for applications in microelectronic device manufacturing. Similarly extraction of the gypsum fiber end seal would increase cost and process difficulty. The fusion of fiber peripheries by heat requires keeping the fibers in mutual contact during the process. For large bundles, fibers nearer the outer portion of the bundle will have more pressure applied to them, in order to apply sufficient pressure to the inner fibers of the bundle. Non-uniform pressure can cause differences in fiber properties in the final potted bundle. The liquid-powdery resin application will require a further step to remove the liquid carrier. The flow of inert gas during fusion requires a separate seal around the fibers and a gas pressure supply and control apparatus.

U.S. Pat. No. 5,015,585 describes a process for making a homopolymer hollow fiber module by thermal bonding techniques which first requires insertion of a metal rod into the lumen of each hollow fiber to maintain its shape and integrity during the bonding process. After bonding is complete, the rods inserted into the fibers are forced through the ends and removed. This disadvantage with this process is the difficulty of reliably placing fine rods into very small diameter lumens and removing the rods after the bonding process.

In U.S. Pat. No. 5,284,584, a method is described in which thermoplastic resin is extruded at elevated temperatures to form a molten band of potting material that is directed onto the surface of a hollow fiber membrane fabric. The hollow fiber membranes constitute the weft of the fabric, with the warp consisting filaments which hold the membrane fibers is a space-apart relationship. The fabric is wound on an axis parallel to the fiber direction while simultaneously extruding the thermoplastic resin onto each bundle end to pot each of the two bundle ends in the thermoplastic resin, serving to seal the bundle end into an adjacent monolithic tube sheet. This method requires the added complexity of weaving a fabric from weak membrane fibers, operating an extruder and fabric. winding systems, and requiring control systems to integrate both activities.

U.S. Pat. No. 5,556,591 discloses a process for potting fibers within a body, comprising forming a bundle of hollow fibers within a hollowed portion of the body, the fibers being aligned substantially longitudinally and uniformly spaced, dispensing along the longitudinal axis of the bundle a molten thermoplastic composition at a contact temperature below the melting point of the fibers, but sufficient to lower the viscosity of the thermoplastic material to flow around all the fibers, applying a pressure differential to the body to assist flow, the bundle being at a temperature low enough to cause solidification of the molten thermoplastic substantially on contact, and forming an impervious seal around every fiber in the bundle and the interior of the body. This process requires an additional pressure differential means applied to the body during the process. Furthermore, dispensing a molten thermoplastic that solidifies on contact would be difficult for large bundles as the first material to solidify would prevent uniform flow of subsequent material.

U.S. Pat. Nos. 5,228,992 and 5,445,771 disclose enhancing hollow fibers by radiation treatment in order to cross-link the fibers throughout their structure and convert them to heat stable structures. The fibers are configured into modules or bundles into a loop or hourglass configuration and potted by injection molding of an intermediate section of the hourglass configuration. The pot is then cut across the potted area to form at least two modules. A special radiation treatment adds process steps to filter manufacturing and is not suitable for perfluorinated thermoplastics, as it will cause degradation of these polymers.

U.S. Pat. Nos. 5,505,858 and 5,662,843 disclose a process for making a filter element of polyolefin hollow fibers by two potting steps. A prepared bundle of fibers of a first polyolefin is immersed in a melted second polyolefin at a temperature not higher than the melting temperature of the first polyolefins and removed before the second polyolefin loses its fluidity and allowed to set. The resulting filter element with the attached second polyolefin is inserted into a second mold having a bottomless cup of nylon or polyolefin attached to the inside, with heating means attached to the outside. The mold contains either melted polyolefin of a low molecular weight which may be the same as the second polyolefin or a melted mixture of the low molecular weight polyolefin and ordinary polyolefin having an average molecular weight larger than that of the low molecular polyolefin. The filter element is removed and allow to set as described above. This method requires two separate heating and molding steps, thereby effectively doubling process complexity.

European Patent Application 0803281 A1 describes a potting process in which hollow fibers with their ends open are inserted into a melt of thermoplastic resin at a temperature not higher than the melting temperature of the raw material for the hollow fiber separating membranes. The melt is then cooled and solidified to form a seal in a half-bonded state showing no compatibility with the macromolecular material used to make the hollow fiber. Then, the open terminal ends of the bundle in the sealing part are opened by cutting or thermally melting the leading ends of the sealed part. This method is not available to all fibers. As described in the disclosure, fibers cannot be potted if the fibers have too high flexure or too low strength at rupture. Also, potting with opened ends can cause the fiber lumens to be filled with excessive potting material. That is, the potting material in the lumen will match the height of the pot, and leave no room for a cut to open the ends. In another embodiment, a paste of potting material dispersed in ethyl alcohol is injected into the open terminals of an outer tube containing a fiber bundle, baking the outer tube thus prepared and allowing the baked outer tube to stand and then cool off in the oven. The disadvantage of this method is that it requires explosion proof operation, due to the flammable nature of the alcohol.

The complex methods developed in the prior art indicate the difficulty of producing hollow fiber filter elements with thermoplastic polymers as potting materials. It is therefore desirable to have a simplified process to produce perfluorinated thermoplastic membrane filter elements in a low cost and efficient manner.

SUMMARY OF THE INVENTION

This invention is a simplified method for manufacturing a filter element of perfluorinated thermoplastic hollow fiber membranes potted with a perfluorinated thermoplastic polymer. The method comprises placing a portion of hollow fiber membrane lengths with at least one closed, into a temporary recess made in a pool of molten thermoplastic polymer held in a container, holding the fiber lengths in a defined position, preferably vertical, maintaining the thermoplastic polymer in a molten state so that it flows into the temporary recess, around the fibers and between the fibers, completely filling the interstitial spaces between fibers with the thermoplastic polymer. A temporary recess is a recess that remains as a recess in the molten potting material for a time sufficient to position and fix the fiber bundle in place and then will be filled by the molten thermoplastic. The temporary nature of the recess can be controlled by the temperature at which the potting material is held, the temperature at which the potting material is held during fiber bundle placement, and the physical properties of the potting material. A temporary recess can also be recess in a solid thermoplastic which will fill when the thermoplastic is heated to a temperature sufficiently above its softening or melting temperature to flow, and held at that temperature for the time necessary to fill the recess. The end of the fiber can be closed by sealing, plugging, or in a preferred embodiment, by being formed in a loop. The loop acts as a closed end, and the two fiber ends are away from the potting material. The fibers encapsulated with molten potting material are removed from the container and cooled to solidify the thermoplastic polymer and form the solid thermoplastic pot. Optionally, the container with the potting material and the potting fiber bundle is cooled, and the potting material and potted fiber bundle removed from the container. Excess thermoplastic polymer potting material is removed and the ends in the pot are opened by cutting through the potting material perpendicularly or at an angle less than 90° to the long axis.

The process can be accomplished by arranging hollow fiber membrane lengths with at least one end sealed in a hollow body such as a tube with both ends open, wherein the hollow body becomes a part of the final filter element. The hollow body has a top and a bottom. The bottom will be placed into the temporary recess in the molten pool of thermoplastic polymer as described above. The long axis of the fibers are arranged substantially parallel to the long axis of the shell. The fibers are held vertically in place in the hollow body by fastener means and support structure means so that they do not rise by buoyancy or sink into the molten pool of potting material during potting. The fibers and shell are arranged so that one sealed end of each fiber is substantially near the bottom of the hollow body and each end is substantially in the same plane. A portion of the bottom of the hollow body with the fiber lengths in place is placed in a temporary recess in a pool of molten thermoplastic polymer held in a container, holding the hollow body in a defined vertical position, maintaining the thermoplastic polymer in a molten state so that it flows into the temporary recess, through and around the fibers and vertically up the fibers, completely filling the interstitial spaces between the fibers and the portion of the hollow body with the thermoplastic polymer. The fibers encapsulated with molten potting material are removed from the container and cooled to solidify the thermoplastic polymer and form the solid thermoplastic pot. Excess thermoplastic polymer potting material is removed and the ends in the pot are opened by cutting through the potting material and the hollow body perpendicularly to the long axis.

Optionally, the fiber lengths can be folded in a tight U-shape and each U-end placed substantially near the bottom of the hollow body with each U-end substantially in the same plane. Optionally, a mat of fibers can be made by arranging individual fiber lengths in a row perpendicular to the fiber length, the fiber lengths substantially equal distances apart, and joining the adjacent fibers ends at each end of the fibers with a continuous means, such as a tape. The continuous means can also seal the ends or one or both ends can be sealed separately. The mat can then be rolled on an axis parallel to the fiber lengths, either on a core or without a core. The rolled-up mat is then placed in the hollow body as described above. In either of these optional methods, the potting then proceeds as described above.

DETAILED DESCRIPTION OF THE INVENTION

This invention provides for a simplified method to produce a filter element comprising a plurality of perfluorinated thermoplastic hollow fiber membranes, of substantially equal length, arranged lengthwise, and perfluorinated thermoplastic end seals, or pots. The invention further provides for the filter element made by the inventive method.

The perfluorinated thermoplastic hollow fiber membranes of this invention are made of polymers such as poly(tetrafluoroethylene-co-perfluoro(alkylvinylether)) or poly(tetrafluoroethylene-co-hexafluoropropylene). The perfluorinated thermoplastic end seals are preferably made of poly(tetrafluoroethylene-co-perfluoro(alkylvinylether)) having a melting point of from about 250° C. to about 260° C. A preferred potting material is Hyflon® 940 AX resin, from Ausimont USA Inc. of Thorofare, N.J. Low viscosity poly(tetrafluoroethylene-co-hexafluoropropylene) with low end-of-melt temperatures as described in U.S. Pat. No. 5,266,639 are also suitable.

Prior to fiber bundle potting, the perfluorinated thermoplastic potting material is prepared by weighing out a predetermined amount of perfluorinated thermoplastic polymer and placing the polymer into a opened top container. The container is preferably a cylinder with a diameter larger than the hollow body or the fiber bundle to be described below. The container has to be made of a material that will withstand high temperatures, for example greater than 300° C., for an extended period of time. A non-reactive metal container with thick walls will suffice. The container with the perfluorinated thermoplastic potting material is placed in a oven maintained at a temperature high enough to melt the perfluorinated thermoplastic polymer and held in the oven for a time long enough to produce a molten pool of the polymer that is degassed. As alternatives to oven heating, the container can be heated by an attached heating means, such as a heater band, or by partial immersion in a heated liquid bath. A temperature range of about 260° C. to about 290° C. is preferred, with a temperature of from about 270° C. to about 280° C. more preferred, and a temperature of about 275° C. most preferred. The temperature has to be lower than the melting temperature of the hollow fibers to be potted. A time of 16–72 hours is satisfactory for holding the molten potting material, with preferred times being 24–48 hours.

Figure 1:
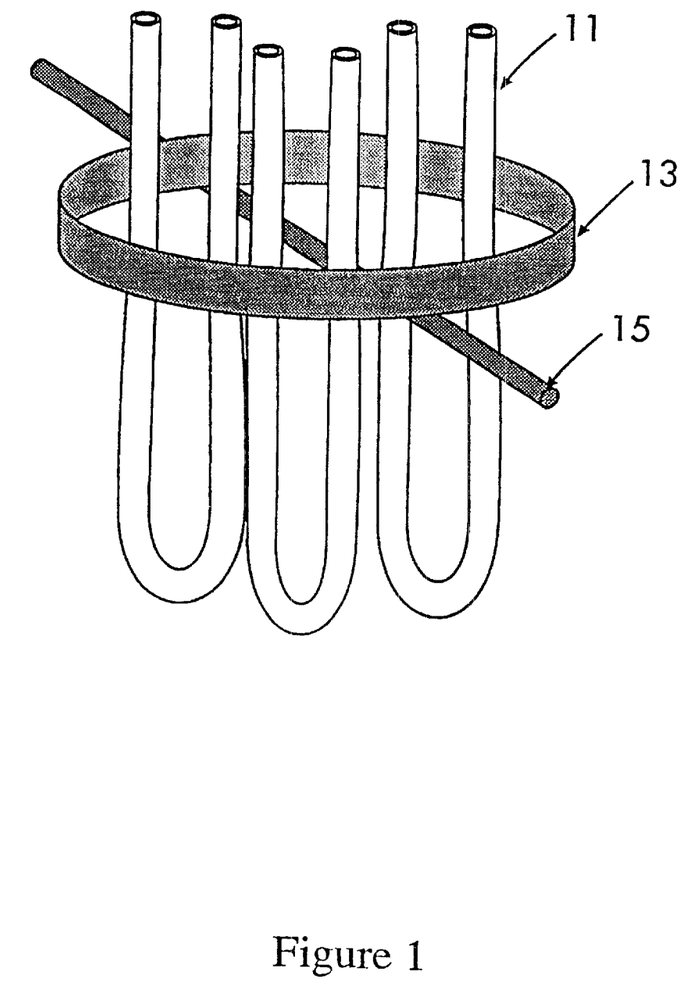
FIG. 1 represents a bundle of hollow fiber membranes with tie means and a thin rod threaded through the fiber bundle.
Figure 2:
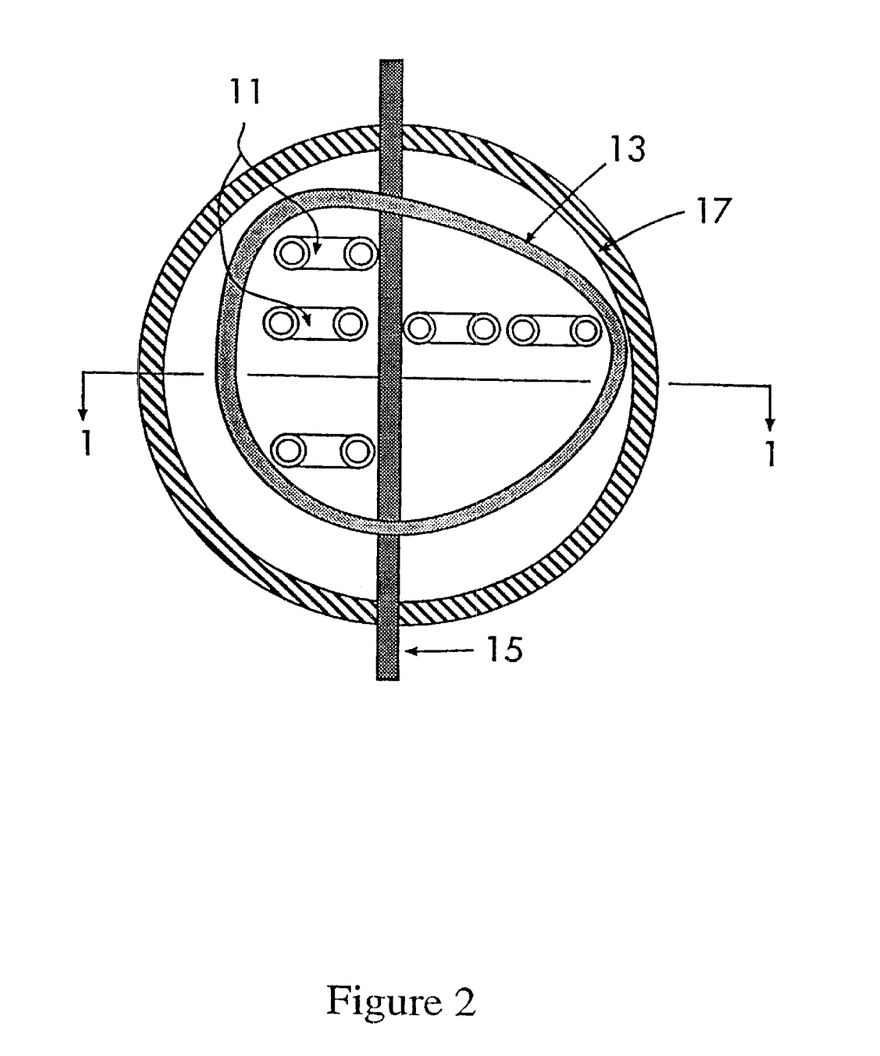
FIG. 2 represents a top view of a fiber bundle held in a hollow cylinder.
Figure 3:
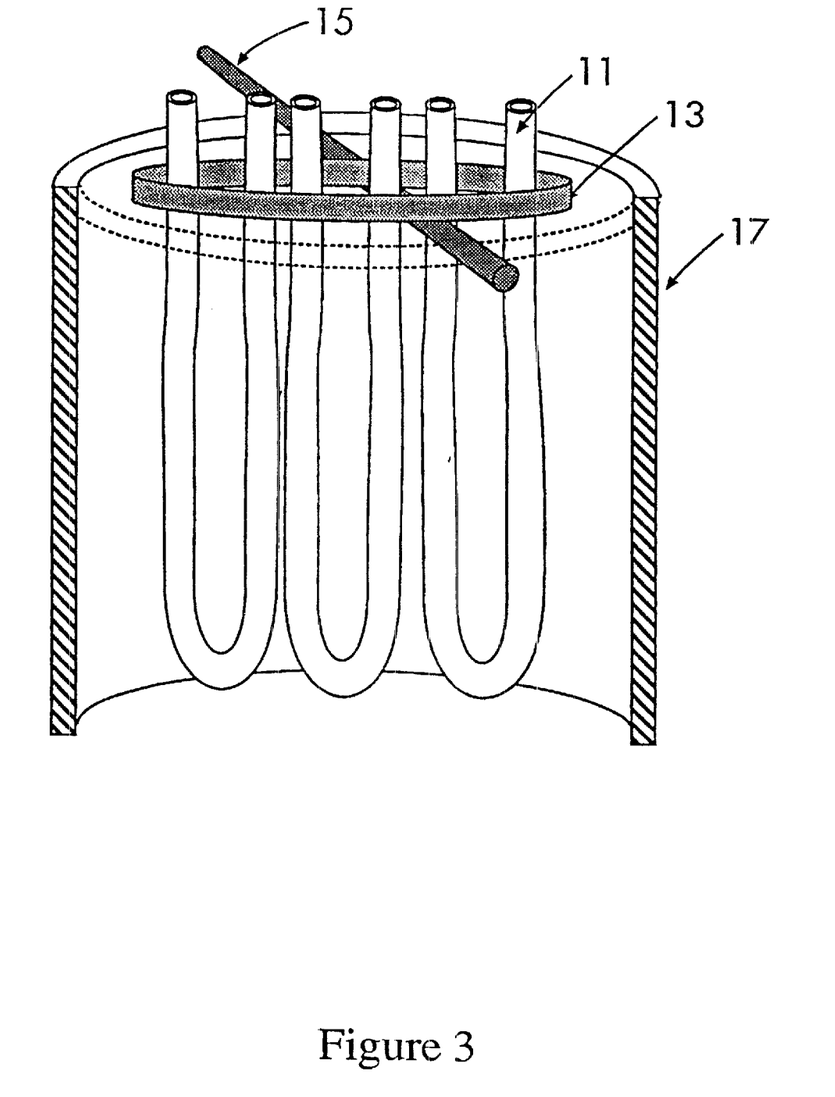
FIG. 3 represents a cross-section of FIG. 2 along line 1—1.
Figure 4:
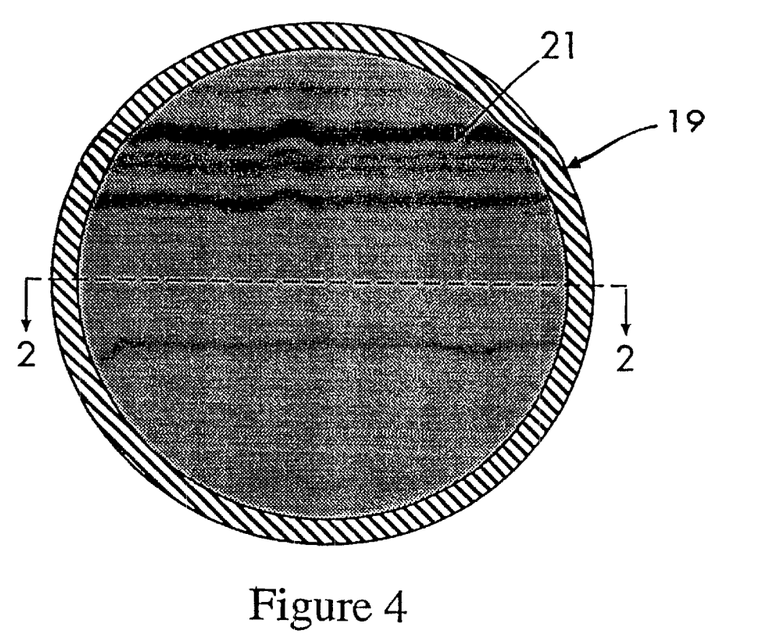
FIG. 4 represents a top view of a container with a molten pool of potting material.
Figure 5:
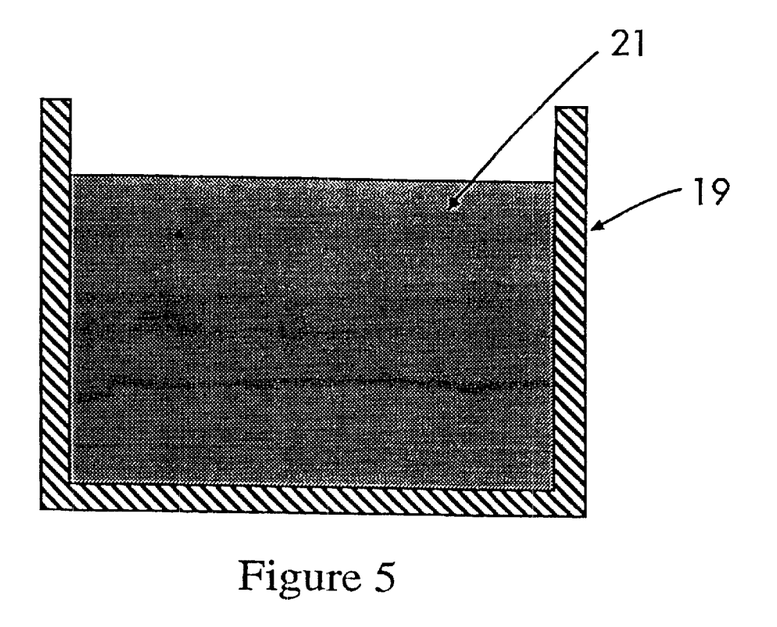
FIG. 5 represents a section along line 2—2 of FIG. 4.
Figure 6:
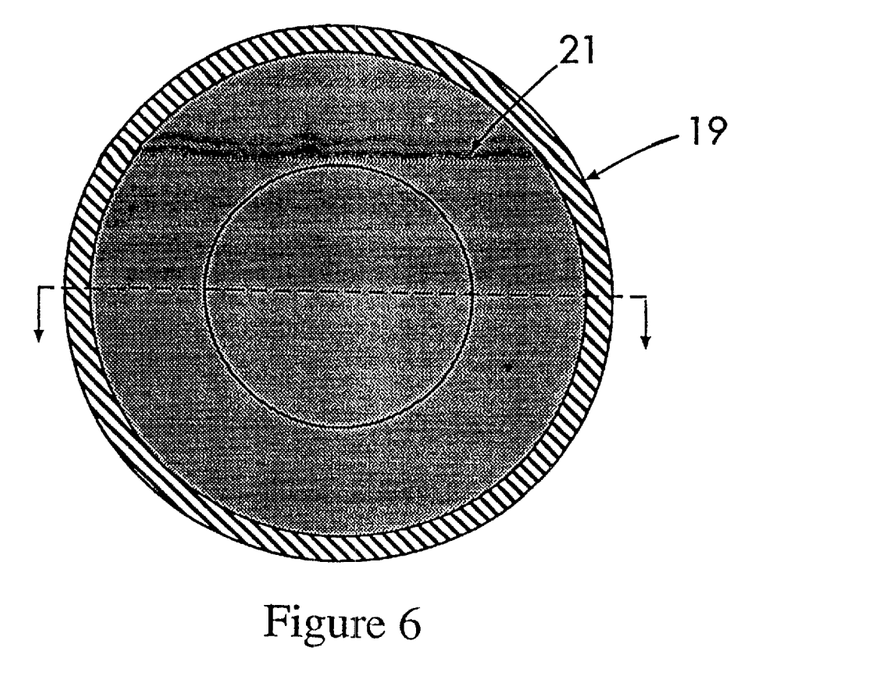
FIG. 6 represents a top view of a container with a temporary recess in a molten pool of potting material.
Figure 7:
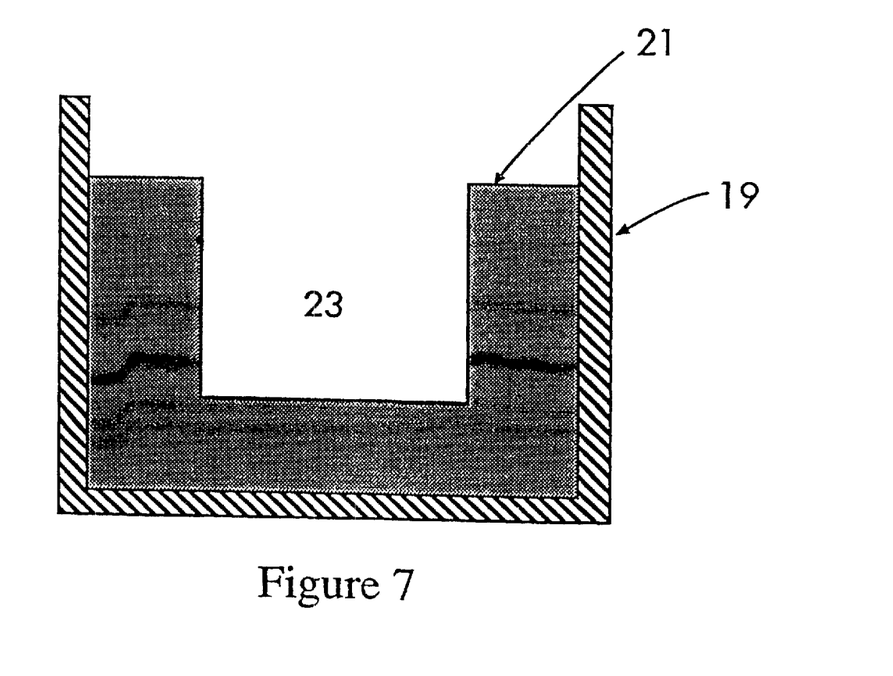
FIG. 7 represents a section along line 3—3 of FIG. 6.
Figure 8:
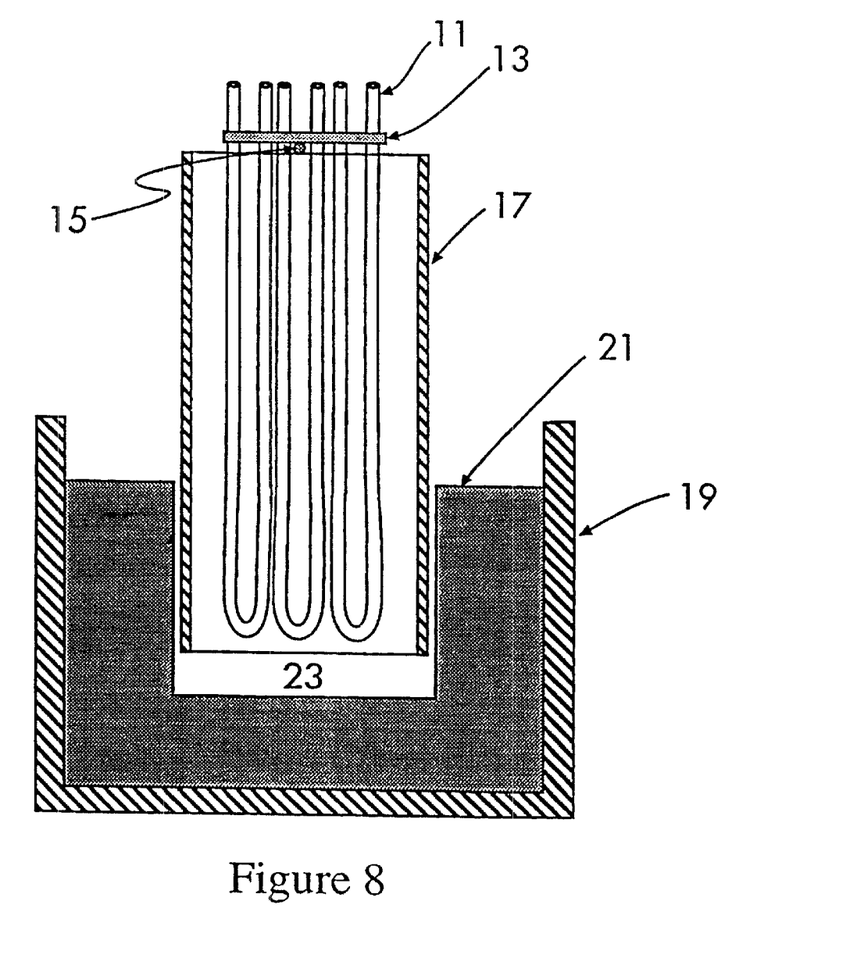
FIG. 8 represents the section shown in FIG. 4 of a container with a molten pool of potting material and a section of along line 2—2 of the hollow fiber membrane bundle held in a hollow cylinder shown in FIG. 2.
Figure 9:
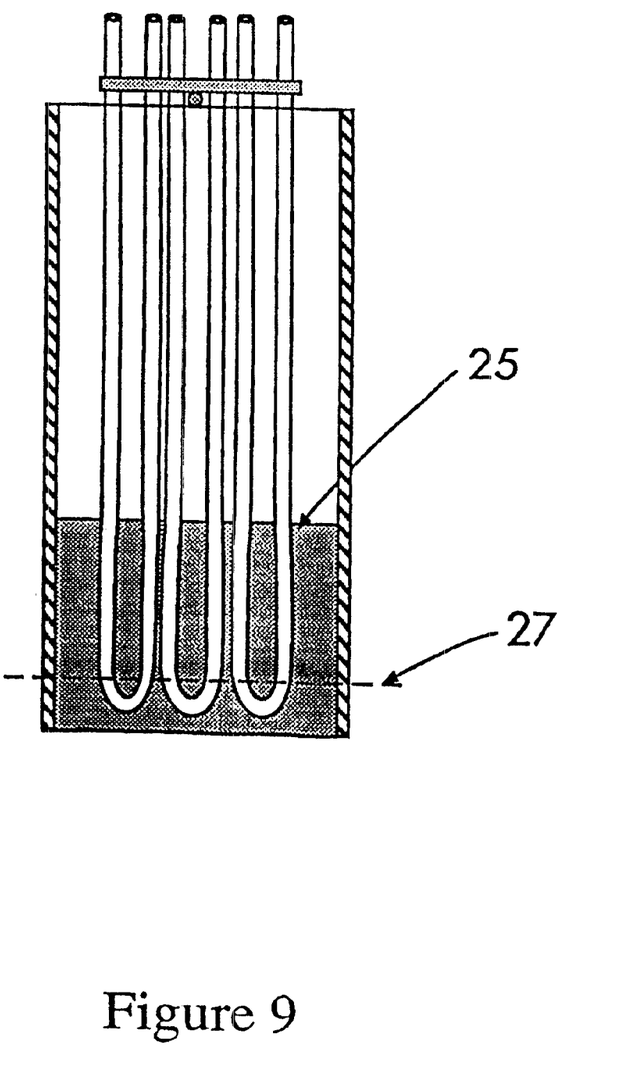
FIG. 9 represents a section of along line 2—2 of the hollow fiber membrane bundle held in a hollow cylinder shown in FIG. 2 after potting, showing the solidified pot and a typical planned cut.

The filter element can be prepared in a variety of ways. The steps of one preferred embodiment comprise;

a) Winding a continuous length of fiber onto a rectangular frame without overlapping the winds. The rectangular frame has a length and a width and the width dimension is approximately the length of the final filter element. Fiber is wound around the frame width and fixed with, for example, a tape along one lengthwise side.

b) The frame with the wound-on fibers is placed in an oven at a temperature of from about 270° C. to about 280° C., with a preferred temperature of 275° C. for from about 16 hours to about 24 hours to heat set the fibers.

c) After the heat set treatment, the fibers are cooled and removed from the frame by cutting through the tape and cutting off excess tape. The result is a number of individual fiber loops in a U-shape with two open ends.

d) The loops are heat relaxed in a 275° C. oven for about 16–24 hours. Heat relaxing is done with the fibers laid unrestrained horizontally to prevent fiber deformation. Alternatively, they can be hung vertically with no other contact.

e) After the heat relaxation step the fibers are cooled The loops are put into a cylinder with both ends open, one end of the cylinder the upper and the other end the lower position in a subsequent step in which the cylinder is positioned vertically in a pool of molten potting material. Other hollow bodies can be used depending on the requirements of the final product. The hollow body can have perforations for fluid flow. The hollow body preferably is made of the same material as the potting material, but can be any material to which the molten potting material forms an impervious bond after cooling. The hollow body can be designed to be the a component for the housing of the final filter element.

f) The fibers are positioned with the loops near the bottom of the cylinder and the two open ends near the top of the cylinder. The fibers are fastened together into a bundle near the top end. One method of fastening is to tie the fibers together near the top end with a length of Teflon® pipe tape. Other tie material or clamping means can be used so long as the fibers are not damaged and the tie or clamping means do not degrade at the temperatures used in the potting procedure.

g) A thin rod is threaded through the bundle, perpendicularly to the fiber lengths, just below the tie. The rod is used to support the bundle at a fixed position in the cylinder so that it does not sink into the molten potting material during the immersion step. FIG. 1 represents the fiber bundle with fiber loops 11, tie means 13 and thin rod 15 threaded through the fibers under the tie means. The rod can be threaded through opposing perforations in the cylinder and supported by the perforations, or laid over the top rim of the cylinder. FIG. 2 represents a top view of the fiber bundle placed in a hollow cylinder 17 showing the thin rod supporting the fiber bundle by the tie means. FIG. 3 is a section along line 1—1 of FIG. 2 showing the loops 11 supported in the hollow cylinder 17 by the thin rod 15.

h) A temporary recess is made in the molten pool of potting material. FIG. 4 represents a top view of container 19 holding a molten pool of potting material 21. FIG. 5 is a section of FIG. 4 along line 2—2. FIG. 6 represents a top view of the container with the temporary recess 23 made in the molten pool. FIG. 7 is a section of FIG. 6 along line 3—3. A cylindrical recess is most convenient, having a diameter larger than that of the cylinder containing the fibers and a depth deeper than the length of the desired pot length. The temporary recess is made with a solid cylinder of the desired diameter made of a material that can withstand the temperature of the molten pool of potting material, and to which the molten potting material does not adhere. Teflon® resin is a preferred material.

i) The fiber containing cylinder is placed into the temporary recess in the pool of molten potting material and held in position by support structure means (not shown). FIG. 8 represents hollow cylinder 17 with supported fiber bundle of fiber loops 11 placed in temporary recess 23 in molten pool 21 of potting material. Support means to maintain the position of hollow cylinder 17 are not shown. The hollow cylinder can touch the floor of the temporary recess if there are openings in the hollow cylinder to allow flow of the potting material into the fiber bundle, or it can be placed above the floor of temporary recess 23. It can be appreciated that the potting material has to have the capability of maintaining the temporary recess for a sufficient time to allow proper placement of the fiber containing cylinder, yet be able to flow into the cylinder and around and up the fibers. Furthermore, the potting material has to be maintained in a molten state at a temperature below the melting point for hollow fiber membranes made from semi-crystalline polymers, or below the softening temperature for hollow fiber membranes made from glassy polymers so that the fibers are not melted or degraded during the potting procedure. The softening temperature is the glass transition temperature of the glassy polymer.

j) The fiber containing cylinder is held at a temperature at which the potting material is molten for a sufficient time to allow the potting material to completely flow into the cylinder and around and up the fibers. Preferred time is in a range of 24 to 48 hours.

k) The hollow cylinder with the hollow fiber membranes encapsulated in the molten potting material are removed from the molten pool of potting material and cooled. Alternatively, the potting material and the fiber containing cylinder are cooled and the fiber containing cylinder and the potting material are removed from the container. In either case, excess potting material is cut away or otherwise removed from the outer diameter of the fiber containing cylinder.

l) The potted ends are opened for fluid flow by cutting through the cylinder and the potting material above the loop ends. FIG. 9 is a section of FIG. 2 along line 1—1 representing the hollow cylinder with the fiber bundle after the potting procedure of steps a) through k). The tie means and thin rod have been removed and solid pot 25 is shown. Planned cut 27 represents a typical cutting location through the hollow cylinder and solid pot and potted fibers. Planned cut 27 is above the loops.

m) The tie holding the fibers together at the top end is removed and the thin rod also removed. The top end is now potted as described in steps h–k. Since these fiber ends were not sealed in a prior step, the potting material will intrude and seal the fibers. The pot is cut through the cylinder and through the sealed ends to produce a filter element with fibers having one end open.

Other methods can be used to prepare the potting material for the potting process. Molten or heated potting material can be introduced into the container by extrusion, for example, and then held at or heated to a temperature high enough to produce a molten pool and lower than the melting temperature of the hollow fibers to be potted. Optionally, the temporary recess in the molten pool can be formed at a temperature low enough to maintain the recess during fiber bundle placement, and then the container with the potting material and fiber bundle raised to a higher temperature, below the melting temperature of the fibers, to increase the rate of potting material flow. Another alternative is to form the recess in a container from the potting material by injection molding or other methods, cool and solidify the potting material so as to retain the recess, place the fiber bundle into the recess as described, and proceed with the heating steps and subsequent process steps. This will presumably require longer heating times. A further alternative is to use a movable piston at the bottom of the cavity, retracting it before or during the formation of the temporary recess and then moving it toward to the fibers after they have been inserted into the recess. This creates a plug flow which leads to more uniform filling of molten material between the fibers, especially in a large bundle. It also allows for the displacement of air entrapped between the fibers or in the molten material. Optionally, for all methods, one can apply a vacuum adjacent the surface of the molten polymer to aid in removal of air bubbles and to cause a more rapid flow of material into the potting area. Additionally, if desired one may heat the fibers with one or more heating devices such as hot air guns, radiant heaters, etc. to reduce the potential for loss of heat from the system by the fibers acting as a heat sink. The temperature at the surface of the fibers must be below the melting or softening point of the fibers. Other such methods may also be used to control, optimize or improve the performance of the process.

The basic method described above can be modified to produce filter elements of different design, or for manufacturing convenience. If it is desired to produce a filter element with both ends open, a portion of the open ends of the loops of paragraph d) above are individually or pair-wise sealed by a heat sealer. An Accu-Seal 530 (Accu-Seal Corporation, San Diego, Calif.) heat sealer modified with 2 mil Kapton® polyimide tape covering the heat bar and the pressure bar or similar heat sealer can be used. Typical operating conditions for hollow fiber membranes made from poly (tetrafluoroethylene-co-perfluoro(alkylvinylether)) are a temperature range of 650° F.–700° F., at a jaw pressure range of 30–50 pounds per square inch, for 7–9 seconds. A length of the open ends shorter than the potted length can be sealed by potting just that length in the same manner as the potting described. The second potting, described in m) will produce open ends when the pot is cut through the cylinder and pot above the heat seal portion or above the shorter potted length seal just described.

Rather than heat sealing the ends, fibers can be produced with loops on both ends by removing the frame from the wound fiber of step b), leaving the fiber as a rectangular coil, which is equivalent to a connected set of fibers having loops on both ends. An amount of the rectangular coil is processed as described in steps d)–m) except that the final cutting will produce a filter element with fibers having both ends open.

In another embodiment, the heat set fiber of step b) is cooled and the fiber loops along both length sides of the rectangular frame are taped and cut to form two rectangular fiber mats. The cut ends are heat sealed with the adjacent fiber ends fused and the tape removed. The mat is heat relaxed as in step d). After cooling, an amount of the mat is then rolled up in the direction perpendicular to the fiber lengths to form a fiber bundle. The mat can be rolled around a solid or perforated hollow core or upon itself. If the hollow core end or ends are to be utilized for fluid passage, they are sealed and potted with the fibers. When opened, the core acts as a fluid passage to the inside of the filter element. The bundle is then potted in a manner similar to the method described in steps e)–m) except that the final cutting of both ends will produce a filter element with fibers having both ends open.

Other forms can be used to prepare an array of fibers in place of a rectangular frame. A solid rectangular sheet can be used. Fiber can be wound on a cylinder and heat set. A three dimensional frame, for example in the form of a parallelepiped, can also be used. Methods of forming a fiber array that result in equally spaced fibers such as a fabric with the hollow fiber membrane as the weft, and a spacing filament as the warp, can be contemplated if the warp fibers are placed so as not to interfere with the flow of potting material.

In a further embodiment, the fibers are not placed in a cylinder or other hollow body, but are potted as a free-standing fiber bundle.

The manner of making the fiber bundle is important to the success of the described method. The fibers cannot be crossed over each other as this will prevent the flow of the thermoplastic potting material from completely surrounding the fiber. The flow of the potting material is driven by only a few centimeters of pressure head at the beginning of the process, and this decreases as the process proceeds and the potting material flows into the temporary recess and lowers the pressure head. Any disturbance in the flow path will cause a flow divergence, which can result in unwanted occlusions in the pot. Therefore, it is important to bundle the fibers in a substantially parallel array.

It is preferred that the fibers be of approximately the same length, but other configurations can be utilized. For example, a gradient of lengths, from the center of the fiber bundle to the outer edge of the bundle, could be used to control flow of melted potting material. Depending on the practitioner's needs, the gradient could be formed with the longest fibers at the center, or the shortest fibers at the center of the bundle. Other configurations may be developed to meet particular product needs.

Also, in the same manner, the fibers cannot be packed too tightly in the hollow body or in a free-standing bundle, or they will prevent flow between fibers with the result of incomplete potting. If the packing density is correctly chosen for the specific fibers being potted, the flowing potting material will force the fibers apart. Packing density is defined as the ratio, expressed as a percentage, of the total cross-sectional area of all the fibers in the bundle to the inner area of the hollow body. For fiber bundles potted without being placed in a hollow body, the ratio is the area of the total cross-sectional area of all the fibers in the bundle to the cross-sectional area of the final potted fiber bundle. "Too tightly" is a function of packing density, final potted length, and fiber stiffness. A practitioner skilled in the art can determine the preferred preferred packing density for a specific hollow fiber membrane. For porous hollow fiber membranes made from poly(tetrafluoroethylene-co-perfluoro(alkylvinylether)) with an outer diameter of approximately 800–1000 microns and a wall thickness of approximately 200 microns, and about 10 centimeters long, a packing density of at least less than 70%, and preferably at least less than 65%, gave satisfactory potted fibers.

With larger bundles, the flowing potting material can compress the bundle, particularly for relatively softer membranes. This can result in overpacking in some regions of the bundle and poor distribution of the flowing potting material. To overcome this problem, a grid, made of thin wires or suitable filament, is placed, for example, about one half inch above the final pot height. The grid divides the fiber bundle into several separate bundles and prevents compression while allowing the potting material to flow freely around the fibers. Other methods of dividing the bundle are possible, such as thin shims. After the potting is complete, the dividers are preferably removed.

The choice of potting material is crucial to the success of the present invention. The perfluorinated thermoplastic polymer used as the potting material must flow under a few centimeters of gravity pressure head. The viscosity and yield stress properties of the polymer have to be low enough so that the polymer will flow at the potting temperature. However, the potting material has to maintain the temporary recess for a long enough period of time so that the fiber bundle can be placed and fixed. In a preferred method, the container with the molten pool of potting material is removed from a 275° C. oven, a temporary recess made, and the fiber bundle in the cylinder placed in the temporary recess and fixed in place by a support structure. During these manipulations, the temporary recess must stay approximately unchanged so that the fibers are not contacted by flowing potting material until the fiber bundle is in its final position. The container with the fiber bundle is then returned to the oven. It is also important that the potting material not flow into the fiber bundle too rapidly and entrap air bubbles, and that flow come primarily up from the bottom of the bundle for a similar reason. The potting material must also have a melting temperature or softening temperature less than the melting or softening temperature of the hollow fiber membranes. A preferred polymer is Hyflon 940 AX (Ausimont USA, Thorofare, N.J.), which has a melting temperature of about 256° C.

The table below gives some physical properties for some perfluorinated thermoplastic polymers and their suitability as potting materials in the present invention.

| Perfluorinated Thermoplastic | Peak melting Temperature (° C.) | End of Melting Temperature (° C.) | Viscosity 275° C. (kPa · Sec) | Suitability |
|---|---|---|---|---|
| MFA 620[1] | 288.8 | 315.2 | | Not suitable |
| FEP 4100[2] | 257 | 296 | 20 | Not suitable; Yield stress |
| 5[3] | 256.6 | ~276 | 1.2 | Suitable |
| 4[3] | 257.1 | 284.7 | 5 | Not suitable; Yield stress |
| 3[3] | 253.6 | 274.4 | 1 | Suitable |
| 2[3] | 258.0 | 286.6 | 2 | Marginally Suitable |

[1]Hyflon ® 620 (Ausimont) poly(tetrafluoroethylene-co-perfluoro(alkylvinylether)), wherein the alkyl is predominately methyl. This polymer was used to make the hollow fiber membranes described in Examples 1–4.
[2]Teflon ® FEP 4100 (DuPont) poly(tetrafluoroethylene-co-hexafluoropropylene)
[3]Different lots of Hyflon ® 940 AX (Ausimont) poly(tetrafluoroethylene-co-perfluoro(alkylvinylether)), wherein the alkyl is predominately methyl.

Melting temperatures were measured using a Perkin-Elmer DSC 7 at 20° C./minute heating rate End of melting temperature is the temperature at which the melting exotherm returns to the temperature baseline.

Viscosities and yield stress of Hyflon® 940 AX and FEP 4100 were measured with a Viscotech rheometer (Rheologica, Lund, Sweden)), at 275° C. All analyses were done with a parallel plate apparatus and the viscosity reported was measured at 0.1 Hz. Creep recovery testing was done on these samples at 275° C. to determine whether or not any of the samples had a yield stress. Yield stress in the context of this invention means that flow will not occur at the given temperature until the applied stress is higher than the yield stress. Creep recovery is measured by applying a prescribed stress profile and the strain required to maintain the prescribed stress level is measured. The stress is initially zero, then instantaneously raised to a given value for a given time and then the stress is returned to zero. The behavior of the compliance, defined as the ratio of strain divided by the initial applied stress, relates to whether the sample is solid-like or liquid-like. Solid-like behavior means that the strain that results from the imposed stress is substantially recovered when the stress is removed. A sample having liquid-like behavior will not recover the strain that results from the imposed stress. Samples indicating a transition from solid-like to liquid-like behavior at increasing stress levels is considered to have a yield stress at the transition. It was found that FEP 4100 and 940 AX #4 had apparent yield stress of approximately 10 Pa.

The following discussion relates to the hollow fiber membranes made from Hyflon® 620 (Ausimont) illustrated in Examples 1–4 and DuPont Teflon® PFA illustrated in example 5 and is meant to illustrate the principles of the present invention, and not to be a limitation to the present invention.

For fibers made with Hyflon® MFA 620, having a melting temperature of approximately 290° C., the MFAC 620 was not suitable as a potting material because the temperature needed to maintain a molten pool, which is at least the peak melting temperature, would melt the fibers of the same material, and the viscosity is too high for flow at temperatures below the melting temperature of the perfluorinated thermoplastic hollow fiber membranes. FEP 4100 is not suitable, even though the melting temperature is less than the melting temperature of the fiber of the Example 1–4, because the viscosity is too high and it had an apparent yield stress which prevented flow. 940 AX #2 is marginally suitable because while the peak melting temperature is less than that of the fibers of the Examples 1–4, and the viscosity is low, it does not flow sufficiently at a temperature less than the melting temperature of the fibers to pot in a practical time. 940 AX #4 was not suitable for the fibers of Examples 1–4, because it had a yield stress and a viscosity that prevented flow at 275° C. The flow properties of #2 and #4 could be due to the end of melting temperature being above the temperature at which the molten pool was held for flow to occur. It is possible that unmelted crystalline regions could retard flow at this temperature. 940 AX #3 and #5 are suitable as they have the proper balance of melting temperature and viscosity and no yield stress for the fibers of Examples 1–4.

In Example 5, 940 AX #4 was used to successfully pot hollow fiber membranes made from DuPont Teflon® PFA, which have a higher melting temperature of approximately 310° C. This potting was done at 290° C., above the end melting temperature of this sample, and where the viscosity is lower than at 275° C.

The method of the present invention relies on the combination of proper fabrication of the fiber bundle so that potting material will flow through and up the fibers unimpeded, making a temporary recess in the potting material, proper placement of the fiber bundle in the recess, and potting materials having the proper combination of melting temperature and viscosity properties. Absent one of these elements, the method cannot be expected to produce highly integral potted fiber or potted filter elements.

The filter element produced by the method of the present invention will be suited for applications requiring extreme chemical resistance and very low potential to add contaminants to the material being filtered. The element will have a high degree of bonding. Indeed, it has been observed that the potting material intrudes into the pores of porous membranes, thereby giving excellent adhesion and complete fiber-potting material bonding.

CHARACTERIZATION METHODS

Visual Bubble Point

The potted fiber element is mounted in a bubble point test holder. The loop is submerged in a glass container of IPA. Air pressure is slowly increased in the lumen of the fibers. The pressure at which the first bubble appears at the outer surface of the fibers is registered as the visual bubble point.

EXAMPLE 1

A container with dimensions of 57 millimeters (mm) diameter, 25 mm deep was partially filled with 45 grams of poly(tetrafluoroethylene-co-perfluoro(alkylvinylether)) having a melting temperature of 256° C. and a melt index 373 at 5 Kg, 373° C. The container was placed in an oven at 275° C. for approximately 24 hours to produce a molten pool of the poly(tetrafluoroethylene-co-perfluoro(alkylvinylether)) in the container. A bundle of 30 hollow fiber membrane fibers was made. The fibers were 8 centimeter long, with an outer diameter of 850 microns, and a wall thickness of 225 microns. The fibers were made from poly(tetrafluoroethylene-co-perfluoro(alkylvinylether)) having a melt temperature of approximately 285° C. The fiber bundle was tied near one end with a length of Teflon® pipe tape. The fibers were placed in a hollow cylinder made of poly(tetrafluoroethylene-co-perfluoro(propylvinylether)) (PFA) having an inner diameter of approximately 6.4 millimeters. The fibers were held in place with a thin rod threaded through the fibers under the tie and with the rod resting on the rim of the hollow cylinder. Fiber packing density was approximately 60%. The container with the molten pool of potting material was removed from the oven and a temporary recess approximately 12 mm deep made in the pool with a Teflon® rod 12.75 mm in diameter. The hollow cylinder was place into the temporary recess and supported in place with a clamp. The container and the hollow cylinder with the fiber bundle was returned to the 275° C. oven and held there at 275° C. for approximately two days. The container and the hollow cylinder with the fiber bundle were removed from the oven after two days and the hollow cylinder with the encapsulated fibers pulled from the molten potting material and allowed to cool and solidify. A cut was made across the diameter of the hollow cylinder through the pot at a position above the looped ends of the fibers in the bundle. The opposing fiber ends were sealed using method similar to the potting method described above. To prevent the pot from melting, the container with molten pool of potting material was held in a heater block maintained at 275° C. so that only the end being sealed was heated. The opposing end of the hollow cylinder was placed in a temporary recess made in the pool and held in place with a clamp. After approximately 2 hours to allow intrusion into a short portion of the fiber ends, the hollow cylinder with the fibers was pulled out of the molten potting material and allowed to cool. Excess potting material was removed.

A cross-section of the pot was examined under an optical microscope. It was observed that the potting material filled the interstitial spaces completely. The potting material had penetrated into the surface pores of the membrane and the interface between the fibers and the potting material was clear. The bundle was immersed in isopropyl alcohol and air pressure applied to the opened fiber ends. The filter element had a visual bubble point of about 45 pounds per square inch, indicating an integral element.

EXAMPLE 2

Approximately 175 poly(tetrafluoroethylene-co-perfluoro(alkylvinylether)) hollow fiber membrane loops having a melting point of approximately 285° C. were bundled and prepared for potting in a similar manner to that of example 1. Fiber packing density was approximately 60%. To reduce the possibility of compression of this larger bundle by the flow of potting material, a wire grid was used to divide to fiber bundle into four approximately equal groups. Potting and opposing fiber end sealing was done similar to the method of example 1. Isopropyl alcohol bubble point testing showed the filter element to be integral.

EXAMPLE 3

A bundle of 16 poly(tetrafluoroethylene-co-perfluoro(alkylvinylether)) hollow fiber membrane loops were placed in a PFA cylinder of approximately 6.4 mm diameter and potted using the method described in Example 1. The potting material was Teflon®FEP 4100 grade resin (DuPont) that had been irradiated with 7.5 Mrads of gamma irradiation. This treatment reduced the molecular weight of the FEP polymer. The viscosity measured at 280° C. was reduced to approximately 18,000 poise at 0.1 reciprocal seconds shear rate, compared to approximately 350,000 poise for the unirradiated polymer. Formation of the degassed potting material and subsequent potting were done at 280° C. The final potted membrane element had a visual IPA bubble point of about 35 pounds per square inch, indicating an integral element.

EXAMPLE 4

A bundle of approximately 500 poly(tetrafluoroethylene-co-perfluoro(alkylvinylether)) hollow fiber membrane loops, approximately 7.6 centimeter long, was placed in a 1 inch (2.54 cm) PFA pipe. The potting material, Ausimont Hyflon® 940 AX resin, was heated in a container in a 275° C. oven until melted and degassed. The container was removed from the oven, a temporary recess made in the molten pool of potting material with a Teflon® rod and the container and potting material cooled to room temperature overnight. The PFA pipe containing the fiber bundle was placed vertically in the recess with the loop ends down. The container with the solidified potting material and the PFA pipe containing the fiber bundle was placed back in the oven and held for approximately 72 hours at 275° C. The PFA pipe with the encapsulated fibers was pulled from the molten potting material and allowed to cool and solidify. A cut was made across the diameter of the hollow cylinder through the pot at a position above the looped ends of the fibers in the bundle. The opposing fiber ends were sealed using method similar to the potting method described in Example 1. Isopropyl alcohol bubble point testing showed the element to be integral.

EXAMPLE 5

A bundle of approximately 48 poly(tetrafluoroethylene-co-perfluoro(alkylvinylether)) hollow fiber membrane loops, approximately 7.6 centimeter long, was placed in a ½ inch (1.27 cm) OD/⅜" (0.95 cm) ID PFA pipe. The hollow fiber membranes were produced from DuPont Teflon® PFA having a melting temperature of approximately 310° C. The fibers were 900 micron OD/400 micron ID. The potting material, Hyflon® 940 AX resin (sample 4 of Table 1.), was heated in a container in a 275° C. oven until melted and degassed. The container was removed from the oven, a temporary recess made in the molten pool of potting material with a Teflon® rod. The PFA pipe containing the fiber bundle was placed vertically in the recess with the loop ends down. The container with the potting material and the PFA pipe containing the fiber bundle was placed back in the oven and held for approximately 72 hours at 290°C. The PFA pipe with the encapsulated fibers was pulled from the molten potting material and allowed to cool and solidify. A cut was made across the diameter of the hollow cylinder through the pot at a position above the looped ends of the fibers in the bundle. The opposing fiber ends were sealed using method similar to the potting method described in Example 1. Isopropyl alcohol bubble point testing showed the element to be integral.

A practitioner skilled in the art of developing and producing filter elements, particularly hollow fiber membrane filter elements, will be able to discern the advantages of the present Invention. It is not the Intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

We claim:

1. A method of potting a plurality of perfluorinated thermoplastic polymer hollow fiber membranes having an inner diameter, an outer diameter, and a porous wall between, arranged lengthwise, having two ends, wherein a portion of one or both ends of said plurality of perfluorinated hollow fiber membranes is potted with a perfluorinated thermoplastic polymer, and wherein at least one potted end is open to fluid flow through said inner diameter, said method comprising:

a) preparing said plurality of perfluorinated thermoplastic polymer hollow fiber membranes into a fiber bundle with at least one end of said bundle restricted to flow of melted perfluorinated thermoplastic polymer potting material through the inner diameter of said fibers, b) making a temporary recess in an amount of a perfluorinated thermoplastic polymer potting material, c) placing said hollow fiber membrane bundle by the closed end in a fixed position in said temporary recess, d) holding said perfluorinated thermoplastic polymer potting material at a temperature below the melting point or softening point of said perfluorinated hollow fiber membranes and above the melting temperature or softening temperature of said potting material, wherein said thermoplastic polymer potting material flows around and up said hollow fiber membranes completely filling the interstitial spaces between fibers of said portion with said perfluorinated thermoplastic polymer, e) cooling said perfluorinated thermoplastic polymer potting material and said hollow fiber bundle to solidify said perfluorinated thermoplastic polymer potting material to form a first potted end, f) optionally, repeating steps a) through d) on second hollow fiber membrane ends to form a second potted end, g) cutting through at least one said potted ends to open said potted hollow fiber membrane ends, and, h) optionally, sealing unpotted hollow fiber membrane ends opposed to a cut potted end.

2. A filter element made by the method of claim 1, said filter element comprising a plurality of perfluorinated hollow fiber membranes having an inner diameter, an outer diameter, and a porous wall between arranged lengthwise in a hollow body, having two ends, wherein a portion of one or both ends of said plurality of perfluorinated hollow fiber membranes is potted with a perfluorinated thermoplastic polymer, and wherein at least one end is open to fluid flow through said inner diameter.

3. The filter element of claim 2 wherein the hollow fiber membranes are made of poly(tetrafluoroethylene-co-perfluoro(alkylvinylether)) or poly(tetrafluoroethylene-co-hexafluoropropylene); and, optionally, wherein the alkyl of said poly(tetrafluoroethylene-co-perfluoro(alkylvinylether)) is propyl, methyl, or blends of methyl and propyl.

4. The filter element of claim 2 wherein the perfluorinated thermoplastic potting material is poly(tetrafluoroethyleneco-perfluoro(alkylvinylether)) or poly(tetrafluoroethylene-co-hexafluoropropylene), and, optionally, wherein the alkyl of said poly(tetrafluoroethylene-co-perfluoro(alkylvinylether)) is propyl, methyl, or blends of methyl and propyl.

5. The filter element of claim 2 wherein the hollow fiber membrane packing density is less than about 70%.

6. The filter element of claim 2 wherein the hollow fiber membrane packing density is less than about 65%.

7. The filter element of claim 2 wherein the hollow fiber membrane packing density is less than about 55%.

8. The method of claim 1 and either:

(a) wherein the hollow fiber membranes are made of poly(tetrafluoroethylene-co-perfluoro(alkylvinylether)) or poly(tetrafluoroethylene-co-hexafluoropropylene); and, optionally,
wherein the alkyl of said poly(tetrafluoroethylene-co-perfluoro(alkylvinylether)) is propyl, methyl, or blends of methyl and propyl;

(b) wherein the potting material has a lower melting or softening temperature than the melting or softening temperature of the material used to make the hollow fiber membranes; and, optionally, either:

(i) wherein the melting or softening temperature of the potting material is at least about 5° C. lower than the melting or softening temperature of the material used to make the hollow fiber membranes;

(ii) wherein the perfluorinated thermoplastic potting material is poly(tetrafluoroethylene-co-perfluoro (alkylvinylether)) or poly(tetrafluoroethylene-co-hexafluoropropylene;

(iii) wherein the melting or softening temperature of the potting material is not lower than approximately 40° less than the melting or softening temperature of the material used to make the hollow fiber membranes;

(iv) wherein the melting or softening temperature of the potting material is not lower than approximately 10° C. less than the melting or softening temperature of the material used to make the hollow fiber membranes;

(c) wherein the perfluorinated thermoplastic potting material is poly(tetrafluoro-ethylene-co-perfluoro (alkylvinylether)) or poly(tetrafluoroethylene-co-hexafluoro-propylene), and, optionally, wherein the alkyl of said poly(tetrafluoroethylene-co-perfluoro(alkylvinylether)) is propyl, methyl, or blends of methyl and propyl;

d) wherein the hollow fiber membranes are packed such that the packing density in a potted hollow fiber bundle produced by such method is less than about 70%;

e) wherein said hollow fiber membranes are arranged lengthwise such that they might be received in a hollow body after potting, and, optionally, f) wherein said hollow body is made of the same materials as the potting material; or wherein the hollow fiber membrane bundle is a rolled-up mat of hollow fiber membranes having both ends sealed, and, optionally, wherein said rolled-up mat is rolled up around a core.

9. The method of claim 8 wherein the perfluorinated thermoplastic potting material is poly(tetrafluoroethylene-co-[perfluoro-(alkylvinylether) having a melting point between about 250° C. and about 260° C.

10. The method of claim 8 wherein the hollow fiber membranes are packed such that the packing density in a potted hollow fiber bundle produced by such method is less than about 65%.

11. The method of claim 8 wherein the hollow fiber membranes are packed such that the packing density in a potted hollow fiber bundle produced by such method is less than about 55%.

* * * * *